Patented Sept. 24, 1935

2,015,223

UNITED STATES PATENT OFFICE 2,015,223

RECOVERY OF ETHYLENE

George Frederick Horsley, Norton Hall, The Green, Norton-on-Tees, England, assignor to Imperial Chemical Industries Limited, a corporation of Great Britain No Drawing. Application October 12, 1932, Serial No. 637,557. In Great Britain October 13, 1931

2 Claims. (Cl. 260—170)

This invention relates to a process for recovering substantially pure ethylene from gases rich in ethylene and containing also other olefines, and consists in treating the gases with a preferential solvent whereby higher olefines, including propylene, are removed in solution in the solvent and gaseous ethylene is obtained substantially free from other olefines.

In particular, the invention relates to a process for the recovery of ethylene which is substantially free from propylene and higher olefines, from cracking still gases and other similar gases.

The production of ethylene free from propylene and other olefines is of considerable importance when the further step of converting the ethylene into ethyl alcohol or other ethyl derivatives, e. g. ethylene glycol, is contemplated, and it is an object of the present invention to produce ethylene of high concentration which may be directly used for the manufacture of ethyl alcohol or other ethyl derivatives of satisfactory purity. It is also an object of the invention to recover a gas containing propylene suitable for the manufacture of propylene derivatives and to reduce the quantities of saturated hydrocarbons contained in such recovered gas.

We have found that a very good solvent for separating propylene and other olefines from ethylene is afforded by a mineral oil fraction approximating to kerosene and substantially all boiling above 200° C. at the ordinary pressure. We have further found that commercial kerosene as such is unsuitable for the purpose of the invention owing to the fact that it contains a substantial amount of constituents boiling below 200° C. Commercial kerosene should therefore be topped to 200° C. before use according to the invention.

According to the invention, therefore gases rich in ethylene and containing also propylene and/or other olefines are washed with such a mineral oil fraction, whereby the propylene and higher olefines are absorbed and ethylene gas remains which is substantially free from other olefines. The operation may be conducted at normal temperature and atmospheric pressure, but preferably increased pressure of about 10–20 atmospheres is employed. Higher pressures may be used if desired, due regard being paid to the possibility of some of the olefines becoming liquefied as a result of the compression. The absorbed gas containing higher olefines and some ethylene may be recovered by heating and/or reducing the pressure on the used solvent and serves as a source of propylene In recovering ethylene from cracking still gases and other similar gases the gases may be subjected to a preliminary treatment to separate the olefines from the non-olefinic constituents, e. g. saturated hydrocarbons and hydrogen.

Example

Cracking still gases were washed at a temperature of 22° C. in counter current with 60 litres per hour of kerosene, boiling between 200 and 300° C., in an unpacked tower 2″ in diameter and 12 feet high, having an effective washing surface of 6.3 square feet. The gases were compressed before scrubbing to a pressure of 21 atmospheres and the gases dissolved in the kerosene were subsequently regenerated by reduction of pressure, firstly to 7 atmospheres and subsequently to atmospheric pressure, the two gas fractions evolved being collected separately:

Under these conditions the following analyses were obtained. The gas volumes are reckoned at normal temperature and pressure:—

|  | Ethylene | Propylene and higher olefines | Methane | Ethane and higher saturated hydrocarbons | Hydrogen and inert gases |
|---|---|---|---|---|---|
|  | Percent | Percent | Percent | Percent | Percent |
| Initial gas 9,000 litres/hr | 26.5 | 17.1 | 29.9 | 20.8 | 5.7 |
| Residual gas, 5,820 litres/hr | 28.2 | 2.4 | 42.8 | 18.1 | 8.5 |
| 1st stage let down 1,000 litres/hr | 36.4 | 23.6 | 16.4 | 22.4 | 1.2 |
| 2nd stage let down 2,180 litres/hr | 17.6 | 53.2 | 1.7 | 27.2 | .3 |

The purified ethylene finally obtained may be directly used for the preparation of ethyl alcohol, by the known processes of absorption in sulphuric acid and distillation or direct hydration with water or steam. The absorbed gas recovered from the used kerosene consists mainly of propylene mixed with ethylene and a small amount of butylene. This gas may be used for the preparation of ethylene and propylene compounds in known manner or it may be treated for the production of additional ethyl alcohol.

The release pressure on the used kerosene is preferably carried out in two or more stages and the gases recovered in the early stages returned to the appropriate stage or stages of the multistage gas compressors if such are used. The gases recovered in the later stages are suitable for use as the raw material for the synthesis of propylene derivatives.

As many apparently widely different embodiments of this invention may be made without departing from the spirit and scope thereof, it is to be understood that I do not limit myself to the specific embodiments thereof except as defined in the appended claims.

I claim:

1. A cyclic process for enriching in ethylene a gas mixture comprising ethylene and propylene, which comprises washing said gas under pressure with a mineral oil fraction approximating to kerosene and the entire fraction boiling above 200° C., separating the used mineral oil from the undissolved gases, releasing the pressure on said used oil in stages, collecting separately the gases evolved in each stage, recompressing the gases evolved in the first stage and joining them with a further portion of the original gas mixture prior to the washing step.

2. In a process for the separation of ethylene from a gas mixture comprising ethylene and propylene by washing said gases with kerosene, the step of washing the gases with a kerosene from which all components boiling below 200° C. have been removed.

GEORGE FREDERICK HORSLEY.